Aug. 28, 1962  R. E. WIGG ET AL  3,051,497
SEALING MEANS BETWEEN RELATIVELY ROTATING PARTS
Filed Jan. 20, 1958

United States Patent Office 3,051,497
Patented Aug. 28, 1962

3,051,497
SEALING MEANS BETWEEN RELATIVELY
ROTATING PARTS
Raymond Ernest Wigg, Littleover, and Norman Battle,
Chilwell, England, assignors to Rolls-Royce Limited,
Derby, England, a company of Great Britain
Filed Jan. 20, 1958, Ser. No. 710,041
Claims priority, application Great Britain Jan. 25, 1957
10 Claims. (Cl. 277—3)

This invention comprises improvements in or relating to sealing means.

It is often necessary to provide sealing means between relatively rotating parts where one part extends through the other part, for the purpose of preventing loss of a pressure fluid through clearances between the parts. For example, in a closed-cycle gas-turbine engine having a power shaft, the shaft may extend from a turbine rotor through a casing wall which defines a chamber containing the rotor fed with a high pressure gas for operating the turbine, and it may be undesirable for the pressure gas to leak from the chamber through the necessary clearances between the rotating shaft and the casing wall.

This invention has for an object to provide a form of sealing means by which such leakage can be avoided.

According to the present invention, sealing means to prevent leakage through a clearance space between relatively rotating parts of which one part extends through the other, comprises a cylindrical-surfaced portion on the one part, a sleeve which is mounted on said other part in a positively sealed manner and has a cylindrical surfaced bore occupied by the cylindrical-surfaced portion of the one part, the cylindrical surfaces of the bore and said portion having a small clearance from one another, the annular clearance space thus formed being open at one end to a chamber containing pressure gas leakage of which is to be prevented, means to deliver a liquid such as oil at a higher pressure than exists in the chamber to the opposite end of said clearance space, and helical grooving in one of the surfaces bounding said clearance space, the grooving being of such hand and the grooving and clearance between the cylindrical surfaces being of such dimensions that, on relative rotation of the parts, a fall of pressure occurs in the liquid tending to flow in the clearance space and a rise of pressure occurs in the gas tending to leak through the clearance space, whereby a liquid/gas interface is created between said ends of the clearance space. The position of this interface will be mainly determined by helium pressure, since the rate of fall of liquid pressure along the shaft will be high relative to the rate of rise of gas pressure.

According to a feature of this invention, the sleeve may be mounted on said other part in a positively sealed manner by means of a bellows member, the ends of which are secured respectively to the sleeve and to said other part. In this way the sleeve is floating and is self-aligning with respect to the cylindrical surfaced portion which it surrounds.

According to another feature of this invention, in constructions having the sleeve floating as just set forth, the sleeve may be provided with an axially-facing abutment surface and said one part may be provided with a co-operating abutment surface, it being arranged that the abutment surfaces engage one another under stationary and low relative speed running conditions of the parts to close off the said opposite end of the clearance space from the means supplying liquid under pressure.

According to yet another feature of this invention, said opposite end of the clearance space between the cylindrical surfaces may be in communication with an annular chamber formed between said parts and fed with liquid under pressure by means of a pump, for instance a gear pump. Alternatively, instead of said annular chamber being fed with liquid under pressure by a gear pump, it may be in communication with a low-pressure liquid space through a clearance between a second cylindrical surfaced portion on the one part and the cylindrical surfaced bore in a second sleeve on the other part, the clearance being small, one of the cylindrical surfaces being formed with helical grooving so as to provide a pump taking up liquid from the low-pressure liquid space and delivering it at high pressure to the annular chamber.

According to yet another feature of the invention, there may be provided means controlling the delivery pressure of the liquid fed to said opposite end of the clearance space in which the liquid/gas interface is formed.

According to yet another feature of this invention, means may be provided adjacent the sealing means and within the chamber containing pressure gas to scavenge therefrom working fluid contaminated by vapour which may leak into the chamber along the seal. Furthermore, if desired, a supply of working fluid under high pressure may be fed to adjacent the seal to avoid variations in the pressure of the working fluid forming the interface, due for example to normal variations in the working fluid pressure in the chamber.

Three constructions of sealing means according to the invention will now be described with reference to the accompanying drawings, in which.

Figure 1:
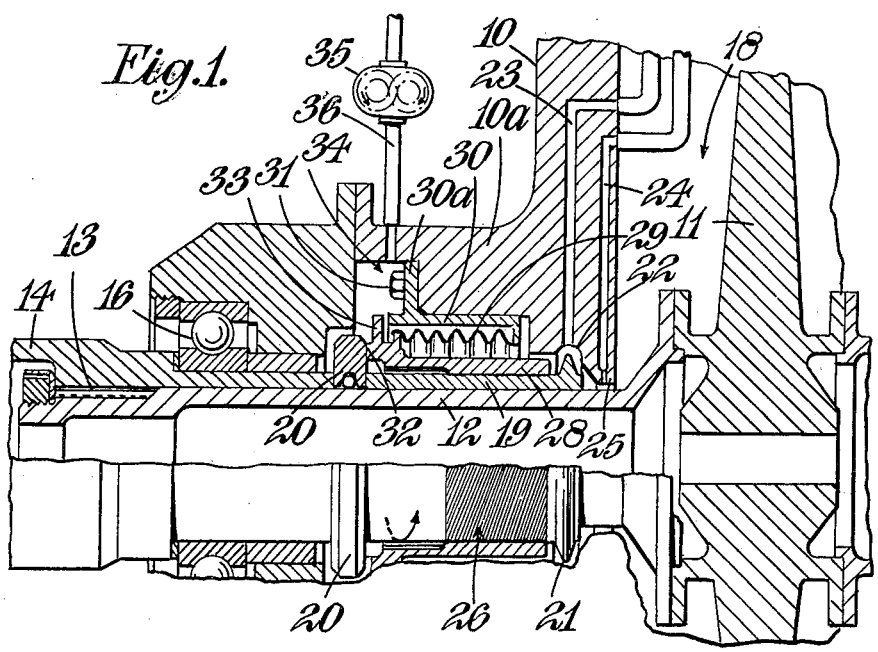
FIGURE 1 is an axial section through part of a turbine showing a seal construction.

Referring to FIGURE 1, the turbine forms part of a closed cycle gas-turbine engine, such as may be operated by a working fluid, e.g. helium, which is heated by using the working fluid to cool a nuclear reactor, and comprises stator structure 10 and a power turbine rotor disc 11 mounted on a stub shaft 12. The stub shaft 12 extends through a hollow boss 10a of the stator structure 10 and has splined engagement at 13 with a main power output shaft 14. The shaft 14 fits closely over the end of the stub shaft 12 and is supported in a bearing 16 accommodated in a housing 17 secured to the stator structure 10.

It is desired to prevent the loss of working fluid from the chamber 18 (part only of which is shown) in which the rotor 11 runs, through the bore of boss 10a in which the shaft 12 extends, and the following arrangement is employed.

A sleeve 19 is fitted on the portion of the stub shaft 12 within the boss 10a, a radially projecting abutment ring 20 being located axially between and in abutment with the end of the sleeve 19 remote from the chamber 18 and the adjacent end of shaft 14. The sleeve 19 has a circumferential rib 21 at its end adjacent the chamber 18 and the rib 21 runs in a groove 22 in the stator structure from the bottom of which extends a delivery duct 23. A second duct 24 is provided in the stator structure 10 leading to an inward flange 25 which is on the chamber side of the groove 22. The sleeve 19 has formed over a length of its outer cylindrical surface a series of fine helical grooves 26.

The sleeve 19 is surrounded by a stationary sleeve 28 having a cylindrical-surfaced bore. The sleeve 28 is secured to one end of a bellows member 29, the other end of which is secured to a tubular housing member 30 fitted in the bore of the boss 10a and secured to it over a flange 30a by bolts 31. At its end remote from chamber 18, the sleeve 28 has an abutment surface 32 to bear on the ring 20 and also a radial flange 33 to co-operate with the tubular housing member 30.

The bearing housing 17 and the boss 10a define between them an annular chamber 34 to which oil under pressure is fed by a gear pump 35 through pipe 36. The oil pressure is arranged to be higher than the pressure of the working fluid in chamber 18.

The dimensions of the grooving 26 and the radial clearance between the sleeves 19, 28 are selected so that, when the turbine is operating, the grooving 26 acts as a pump and the hand of the grooving 26 is selected so that the pumping action tends to oppose the flow of oil into the annular clearance space between the sleeves 19, 28 towards the chamber 18 and to increase the pressure of working fluid tending to leak from the chamber 18 through the annular clearance space between the sleeve 19 and the sleeve 28.

Where as indicated by the arrow the shaft 12 rotates in a clockwise direction as viewed from the right of the drawing, the helical grooving 26 will run in an anticlockwise direction from the right-hand end of the grooving to the left-hand end.

In operation under normal running conditions, the sleeve 28 is urged to the right by the pressure loads acting on it so that the surface 32 is clear of ring 20 and pressure oil reaches the left hand end of the grooving 26 and penetrates the annular clearance space to a distance from the left hand end of sleeve 19 dependent upon the fall of pressure in the oil and upon the rise of pressure in the working gas. At this point a stable oil/working gas interface which acts as a seal will be formed so preventing leakage of the gas.

Under low speed conditions and stationary conditions, the oil pressure in chamber 34 is reduced so allowing a seal to be formed by surface 32 being pressed against ring 20 due to the gas pressure load acting on the sleeve 28.

Furthermore, when the turbine is operating, the rib 21 acts as a scavenge pump so that any working fluid which may be contaminated with oil vapour is delivered away from chamber 18 through duct 23. Also, in order to avoid variations in the working fluid pressure in the clearance between sleeve 19, 28, a working fluid supply under a constant high pressure may be effected through duct 24, although the seal will normally accommodate automatically a range of helium pressures by axial movement of the liquid/helium interface.

The flange 33 acts by abutment with the member 30 to limit movement to the right of the sleeve 28.

Figure 2:
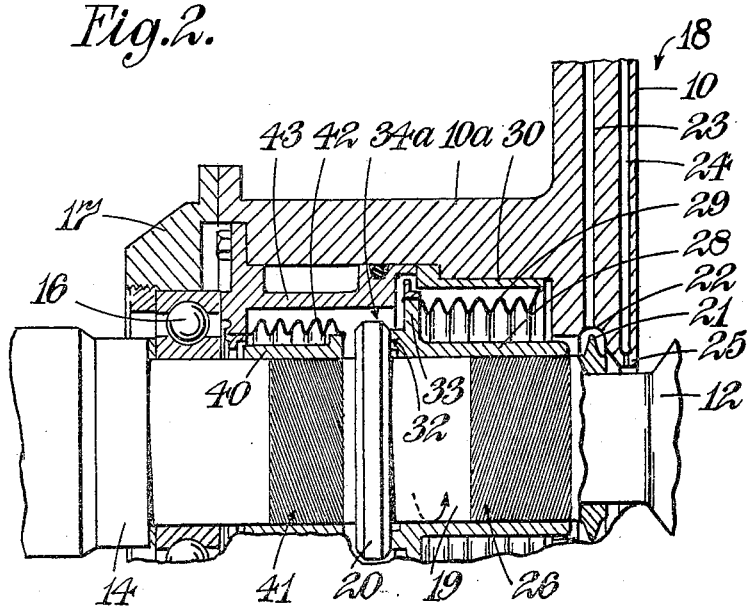
FIGURE 2 is a similar view of a second construction.

Referring now to FIGURE 2, there is shown an alternative method of supplying oil under pressure to the clearance space between the sleeves 19 and 28 so as to provide automatic operation of the face seal at surface 32 on ring 20.

In this construction, the space 34a communicating with the left-hand end of the grooving 26 is in communication with the interior of the housing 17 for the bearing 16 by way of an annular clearance space between the end of shaft 14 and a sleeve 40 surrounding the end of the shaft 14. The portion of the shaft 14 encircled by the sleeve 40 is formed with a series of fine helical grooves 41, which are similar to the grooving 26 but are of opposite hand. The sleeve 40 is secured to one end of a bellows element 42 the opposite end of which is secured to a tubular bellows housing member 43 which is fitted within the end of the bore in the boss 10a and which also provides an abutment for the stationary race of the bearing 16.

In operation, the grooving 41 on the end of shaft 14 acts as a pump taking up oil which has been fed to the bearing 16 for lubricating purposes and delivering this oil at increased pressure to the space 34a. The proportions of sleeve 28 are such that, with this pressure increasing as the turbine comes up to running speed, the sleeve 28 is moved axially against the working fluid pressure within the turbine casing, thereby to move the sealing face 32 clear of the ring 20, and the movement of sleeve continues until the flange 33 abuts the end of the tubular housing member 30.

Thus the operation of the rubbing face seal is automatic. When the shaft is stationary, abutment surface 32 is in contact with ring 20 and, as in the construction of FIGURE 1, during normal running conditions, the abutment surface 32 is clear of the ring 20 and pressure oil flows into the clearance space between the sleeves 19 and 28 to form an oil/working fluid interface at a point in the length of the grooving 26.

Figure 3:
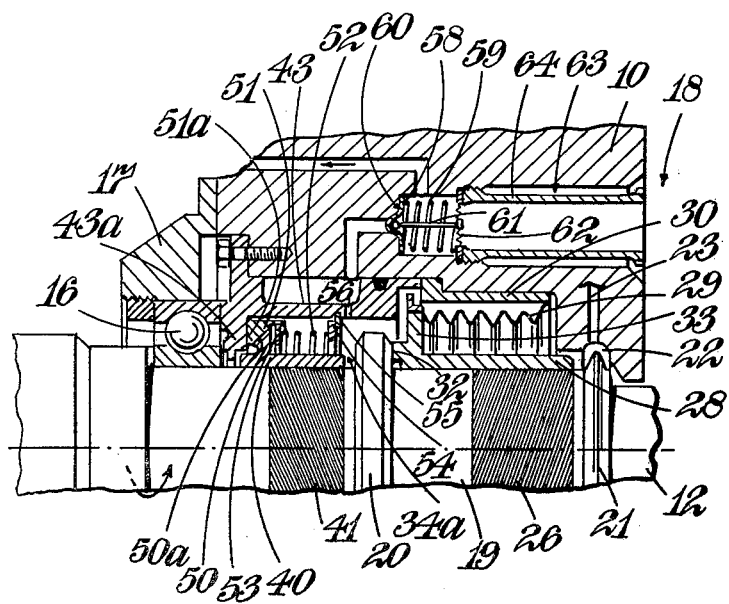
FIGURE 3 is a similar view of a third construction.

In FIGURE 3, a construction is shown which is similar to FIGURE 2 and the same references are employed in both figures to indicate like parts.

Since there is oil at each end of the sleeve 40, the bellows 42 of FIGURE 2 may be omitted and a simple mechanical seal may be provided. The mechanical seal shown comprises a radial flange 50 on the end of sleeve 40, the flange having an axially-facing part-spherical surface 50a engaging a complementary recess in a ring 51 which also has a seal surface 51a abutting a radial surface on a flange 43a of the tubular member 43. A compression spring 52 at one end bears on the flange 50 and ring 51 through an abutment ring 53 and at its other end bears on a ring 54 which is located axially with respect to the member 43 by a spring circular clip 55.

Also there is provided means for preventing the oil pressure in space 34a becoming excessive. For this purpose the space 34a communicates via a port 56 with a duct 57 leading to an oil drain, the duct having in it a valve 58 which is both spring-loaded and pressure-loaded by the working gas.

The valve 58 is held by a spring 59 against a seating 60 and is also loaded by a push rod 61 carried by a flexible diaphragm 62 which is held in position in a recess 63 in the structure 10 by a hollow plug 64. The bore of plug 64 opens to the chamber 18 so that the diaphragm 62 is loaded in the sense of closure of valve 58 on to its seat 60 by a pressure load dependent on the working gas pressure. This arrangement has the advantage that the pressure in space 34a cannot exceed a predetermined maximum which at any instant is dependent on the working gas pressure, and further that the plane of the oil/working gas interface is maintained substantially constant. Thus duct 24 provided in FIGURES 1 and 2 to supply helium at constant pressure to the seal, is not required.

In each of the constructions above described it will be seen that the sleeves 28 and in the construction of FIGURES 2 and 3 also the sleeve 40 are in effect floating on the rotating shaft and thus the sleeves 28 and 40 are self-aligning with respect to the rotating structure and the clearances employed between them can be relatively small, for instance a clearance of the order of 0.002 inch may be employed.

We claim:
1. Sealing means to prevent leakage through a clearance space between relatively rotating parts of which one part extends through the other part, which means comprises a cylindrical-surfaced portion on the one part, a sleeve which is carried by said other part and has a cylindrical-surfaced bore occupied by the cylindrical-surfaced portion of the one part, a bellows member having one end connected to the sleeve and its other end connected to said other part to mount the sleeve on said other part in a positively sealed manner, the cylindrical surfaces of the bore and said portion having a small clearance from one another, the annular clearance space thus formed being open at one end to a chamber containing pressure gas leakage of which is to be prevented, said relatively rotating parts defining between them an annular chamber communicating with the opposite end of said clearance space, means to deliver oil under pressure to said annular chamber at a pressure exceeding that of the gas in the gas-containing chamber, fine helical grooving in one of the surfaces bounding said clearance space, the helical grooving in said one surface and the other surface together forming a pump creating a fall of pressure in the oil tending to flow in the clearance space and a rise of pressure in the gas tending to leak through the clearance space, whereby stable oil/gas interface is created between said ends of the clearance space, said means delivering oil under pressure to the annular chamber comprising a space containing oil at low-pressure, a second cylindrical-surfaced portion on said one part, a second sleeve on said other part, said second sleeve having a cylindrical-surfaced bore within which said second cylindrical-surfaced portion extends with a small radial clearance communicating at one end with the low-pressure oil space and at the other end with the annular chamber, one of the cylindrical surfaces of the second portion and second sleeve being formed with helical grooving to provide a pump taking up oil from the low-pressure oil space and delivering the oil at high pressure to the annular chamber.

2. Sealing means according to claim 1, wherein the second sleeve is connected with said other part in a self aligning manner.

3. Sealing means according to claim 2, wherein the second sleeve is connected with the other part by means of a second bellows member, the ends of which are secured to the second sleeve and to the other part respectively.

4. Sealing means according to claim 2, wherein the second sleeve is provided with a part-spherical surfaced portion which co-operates with a ring having a complementary surface, and there is provided a spring urging said part-spherical surfaced portion into contact with the complementary surface and the ring into axial abutment with the other part.

5. Sealing means to prevent leakage through a clearance space between relatively rotating parts of which one part extends through the other part, which means comprises a cylindrical-surfaced portion on the one part, a sleeve which is carried by said other part and has a cylindrical-surfaced bore occupied by the cylindrical-surfaced portion of the one part, a bellows member having one end connected to the sleeve and its other end connected to said other part to mount the sleeve on said other part in a positively sealed manner, the cylindrical surfaces of the bore and said portion having a small clearance from one another, the annular clearance space thus formed being open at one end to a chamber containing pressure gas leakage of which is to be prevented, means to deliver oil at a higher pressure than exists in the chamber to the opposite end of said clearance space, and fine helical grooving in one of the surfaces bounding said clearance space, the helical grooving in said one surface and the other surface together forming a pump creating a fall of pressure in the oil tending to flow in the clearance space and a rise of pressure in the gas tending to leak through the clearance space, whereby stable oil/gas interface is created between said ends of the clearance space, and comprising means to control the pressure of the oil delivered to said opposite end of the clearance space comprising a drain outlet connected to said opposite end of the clearance space and a biasing valve in the drain outlet, the load on the valve controlling the oil pressure.

6. Sealing means according to claim 5, wherein the valve is subjected in the sense of closure to a spring load and to a load dependent on the gas pressure in the chamber from which leakage is to be prevented.

7. Sealing means according to claim 6, wherein the load dependent on the gas pressure is applied through a flexible diaphragm subjected on one surface to the gas pressure in the chamber.

8. Sealing means to prevent leakage of gas between a shaft and a wall of a pressure-gas-containing chamber through an aperture in which the shaft extends, said sealing means comprising a member having a cylindrical external surface secured on the shaft within the aperture, a radially-projecting ring on the shaft adjacent the end of said member remote from the chamber, a sleeve encircling said member, there being an annular clearance space between the member and sleeve having one end in communication with the chamber, a bellows member secured by one end to the sleeve and by its other end to the wall around the aperture and providing a gas-tight seal between the sleeve and wall, the sleeve having an axially-facing surface at its end remote from the chamber co-operating in abutment with said radially-projecting ring, the bellows member permitting axial displacement of the sleeve to separate the axially-facing surface from the ring, means carried by the wall and cooperating with the shaft to define an annular chamber which communicates with the annular clearance space when the axially-facing surface is separated from the ring, means delivering oil to the annular chamber at a pressure higher than the gas pressure in the chamber and fine helical grooving on the cylindrical surface of the member, the helical grooving extending around the member, considered as from the gas chamber to the radially-projecting ring, in a circumferential sense opposite to the direction of rotation of the shaft, and the said annular clearance space between the member and the sleeve having a generally radial dimension, whereby, on rotation of the shaft, a fall of pressure occurs in the oil tending to flow in the clearance space and a rise of pressure occurs in the gas tending to leak through the clearance space, whereby an oil/gas interface is created between said ends of the clearance space, said means delivering oil under pressure to the annular chamber comprising a second cylindrical surfaced member on the shaft on the side of the ring remote from the pressure-gas-containing chamber, a second sleeve surrounding the second member with small radial clearance, the annular clearance space thus formed comunicating at one end with the annular chamber and at the other end with a space containing lubricating oil at low pressure, a bellows member connecting the second sleeve to the wall, and helical grooving on the cylindrical surface of the second member, the hand of the grooving and the radial clearance being selected so that the grooving acts as a pump delivering oil from the bearing through the clearance into the annular chamber.

9. Sealing means to prevent leakage of gas between a shaft and a wall of a pressure-gas-containing chamber through an aperture in which the shaft extends, said sealing means comprising a member having a cylindrical external surface secured on the shaft within the aperture, a radially-projecting ring on the shaft adjacent the end of said member remote from the chamber, a sleeve encircling said member, there being an annular clearance space between the member and sleeve having one end in communication with the chamber, a bellows member secured by one end to the sleeve and by its other end to the wall around the aperture and providing a gas-tight seal between the sleeve and wall, the sleeve having an axially-facing surface at its end remote from the chamber co-operating in abutment with said radially-projecting ring, the bellows member permitting axial displacement of the sleeve to separate the axially-facing surface from the ring, means carried by the wall and cooperating with the shaft to define an annular chamber which communicates with the annular clearance space when the axially-facing surface is separated from the ring, means delivering oil to the annular chamber at a pressure higher than the gas pressure in the chamber, and fine helical grooving on the cylindrical surface of the member, the helical grooving extending around the member, considered as from the gas chamber to the radially-projecting ring, in a circumferential sense opposite to the direction of rotation of the shaft, and the said annular clearance space between the member and the sleeve having a generally radial dimension, whereby, on rotation of the shaft, a fall of pressure occurs in the oil tending to flow in the clearance space and a rise of pressure occurs in the gas tending to leak through the clearance space, whereby an oil/gas interface is created between said ends of the clearance space, said means delivering oil under pressure to the annular chamber comprising a second cylindrical surface member on the shaft on the side of the ring remote from the pressure-gas-containing chamber, a second sleeve surrounding the second member with small radial clearance, the annular clearance space thus formed communicating at one end with the annular chamber and at the other end with a space containing lubricating oil at low pressure, an axially-facing part-spherical surface on the second sleeve, a ring having a complementary spherical surface cooperating with the part-spherical surface of the second sleeve, the ring also having a sealing surface cooperating in axial abutment with the wall, a spring urging said part-spherical surfaces into engagement and the sealing surface into abutment with the wall, and helical grooving on the cylindrical surface of the second member, the hand of the grooving and the radial clearance being selected so that the grooving acts as a pump delivering oil from the low-pressure-oil-containing space through the clearance into the annular chamber.

10. Sealing means according to claim 9, comprising also a drain outlet from the annular chamber, a valve controlling the drain outlet, a spring loading said valve in the sense of closure, a flexible diaphragm loaded on one surface by the gas pressure in the pressure-gas-containing chamber, and connected to load said valve in the sense of closure in accordance with the gas pressure.

References Cited in the file of this patent

UNITED STATES PATENTS

| | | |
|---|---|---|
| 1,041,485 | Kieser | Oct. 15, 1912 |
| 1,964,063 | Kagi | June 26, 1934 |
| 2,042,691 | Williams | June 2, 1936 |
| 2,100,220 | King | Nov. 23, 1937 |
| 2,149,974 | McCormack | Mar. 7, 1939 |
| 2,182,981 | Krost et al. | Dec. 12, 1939 |
| 2,329,990 | Hornschuch | Sept. 21, 1943 |
| 2,389,528 | McConaghy | Nov. 20, 1945 |
| 2,474,123 | Schmitz | June 21, 1949 |
| 2,589,631 | Schmitz | Mar. 18, 1952 |

FOREIGN PATENTS

| | | |
|---|---|---|
| 148,932 | Great Britain | Oct. 10, 1921 |